(12) United States Patent
Wolanski et al.

(10) Patent No.: US 11,149,702 B2
(45) Date of Patent: Oct. 19, 2021

(54) INJECTOR OF AN OVER-ENRICHED FUEL-AND-AIR MIXTURE TO THE COMBUSTION CHAMBER OF INTERNAL COMBUSTION ENGINES

(71) Applicant: Instytut Lotnictwa, Warsaw (PL)

(72) Inventors: Piotr Wolanski, Warsaw (PL); Wlodzimierz Balicki, Warsaw (PL); Piotr Kalina, Warsaw (PL); Witold Perkowski, Warsaw (PL)

(73) Assignee: INSTYTUT LOTNICTWA, Warsaw (PL)

( * ) Notice: Subject to any disclaimer, the term of this patent is extended or adjusted under 35 U.S.C. 154(b) by 159 days.

(21) Appl. No.: 16/044,387

(22) Filed: Jul. 24, 2018

(65) Prior Publication Data
US 2019/0040828 A1 Feb. 7, 2019

(30) Foreign Application Priority Data
Jul. 24, 2017 (PL) ........................................ 422320

(51) Int. Cl.
*F02M 53/06* (2006.01)
*F02M 31/18* (2006.01)
(Continued)

(52) U.S. Cl.
CPC ............. *F02M 53/06* (2013.01); *F02B 13/00* (2013.01); *F02C 3/22* (2013.01); *F02C 3/24* (2013.01); *F02C 7/224* (2013.01); *F02M 25/00* (2013.01); *F02M 26/00* (2016.02); *F02M 31/18* (2013.01); *F02M 67/10* (2013.01); *F02M 69/08* (2013.01);
(Continued)

(58) Field of Classification Search
CPC ........ F23R 3/286; F23R 7/00; F23C 2202/00; F23C 2202/10; F23C 2202/20; F23C 2202/30; F23C 2900/07002; F02C 3/34; F02C 3/22; F02C 3/24; F02C 7/224; Y02E 20/344; F02M 26/00; F02M 31/00; F02M 53/06; F02M 25/00; F23D 11/402; F23D 11/24; F02B 13/00
See application file for complete search history.

(56) References Cited

U.S. PATENT DOCUMENTS 4,089,638 A * 5/1978 Trucco ..................... F23C 7/06
431/208
4,464,314 A * 8/1984 Surovikin ............. B01F 5/0057
239/400

(Continued)

*Primary Examiner* — Alain Chau
(74) *Attorney, Agent, or Firm* — Masuvalley & Partners

(57) ABSTRACT

A fuel injector for injecting an over-enriched fuel and air mixture to the combustion chamber of an internal combustion engine includes a spray nozzle, a gaseous carrier, a fuel mixing and evaporation chamber and an injector nozzle. During operation, both a liquid fuel and the gaseous carrier are supplied to the fuel mixing and evaporation chamber of the injector through the spray nozzle, where they are mixed and evaporated as a result of elevated temperature, and the mixture reaches the combustion chamber. The gaseous carrier is air or, flue gas, at elevated pressure and temperature and having a composition that prevents the initiation of flame combustion, and the gaseous carrier has an oxygen content low enough to prevent the initiation of combustion, even under conditions of elevated pressure and temperature.

4 Claims, 3 Drawing Sheets

(51) Int. Cl.

| | | |
|---|---|---|
| *F23D 11/24* | (2006.01) | |
| *F02M 69/08* | (2006.01) | |
| *F23D 11/44* | (2006.01) | |
| *F23D 11/40* | (2006.01) | |
| *F23R 3/28* | (2006.01) | |
| *F02M 26/00* | (2016.01) | |
| *F02B 13/00* | (2006.01) | |
| *F02C 3/22* | (2006.01) | |
| *F02C 3/24* | (2006.01) | |
| *F02C 7/224* | (2006.01) | |
| *F02M 25/00* | (2006.01) | |
| *F23R 7/00* | (2006.01) | |
| *F23R 3/32* | (2006.01) | |
| *F02M 67/10* | (2006.01) | |

(52) U.S. Cl.
CPC ............ *F23D 11/24* (2013.01); *F23D 11/402* (2013.01); *F23D 11/44* (2013.01); *F23R 3/286* (2013.01); *F23R 3/32* (2013.01); *F23R 7/00* (2013.01); *F05D 2220/32* (2013.01); *F05D 2240/36* (2013.01); *F23D 2209/10* (2013.01)

(56) References Cited

U.S. PATENT DOCUMENTS

| | | | | |
|---|---|---|---|---|
| 5,345,768 A * | 9/1994 | Washam | ............... | F23C 7/004 60/737 |
| 5,361,576 A * | 11/1994 | Muller | ............... | F23R 3/286 60/773 |
| 6,161,527 A * | 12/2000 | Ruman | ............... | F02M 69/08 123/533 |
| 8,246,345 B2 * | 8/2012 | Schutz | ............... | F23D 14/64 431/181 |
| 8,544,280 B2 * | 10/2013 | Lu | ............... | F02C 5/02 60/772 |
| 8,627,799 B2 * | 1/2014 | Johnson | ............... | F02M 23/14 123/306 |
| 8,899,969 B2 * | 12/2014 | Gard | ............... | F23K 5/22 122/40 |
| 2001/0031440 A1 * | 10/2001 | Fullemann | ............... | F23C 9/006 432/175 |
| 2002/0119412 A1 * | 8/2002 | Loving | ............... | F23D 17/005 431/252 |
| 2005/0183413 A1 * | 8/2005 | Kojima | ............... | F23R 7/00 60/247 |
| 2009/0277178 A1 * | 11/2009 | Carroni | ............... | F23D 14/64 60/742 |
| 2009/0277182 A1 * | 11/2009 | Engelbrecht | ............... | F23D 11/36 60/772 |
| 2010/0162710 A1 * | 7/2010 | Senior | ............... | F23R 3/286 60/737 |
| 2011/0179800 A1 * | 7/2011 | De La Cruz Garcia | ............... | F01K 23/10 60/772 |
| 2011/0229836 A1 * | 9/2011 | Schutz | ............... | F23D 14/64 431/181 |
| 2012/0315586 A1 * | 12/2012 | Gard | ............... | F23K 5/22 431/11 |
| 2013/0284013 A1 * | 10/2013 | Rohs | ............... | F01B 3/0002 91/418 |
| 2013/0306181 A1 * | 11/2013 | Mitchell | ............... | F23D 11/408 137/888 |
| 2014/0182303 A1 * | 7/2014 | Antoniono | ............... | F23R 3/10 60/783 |
| 2017/0146244 A1 * | 5/2017 | Kurosaka | ............... | F23R 3/10 |
| 2018/0274788 A1 * | 9/2018 | Greene | ............... | F02C 5/02 |

* cited by examiner

INJECTOR OF AN OVER-ENRICHED FUEL-AND-AIR MIXTURE TO THE COMBUSTION CHAMBER OF INTERNAL COMBUSTION ENGINES

RELATED APPLICATIONS

This application claims priority to Polish Patent Application No. PL422320, filed Jul. 24, 2017, which is hereby incorporated herein by reference in its entirety.

The invention relates to an injector of an over-enriched fuel-and-air mixture to the combustion chamber of internal combustion engines. In particular, the invention encompasses a fuel injector that supplies fuel in the form of an over-enriched fuel mixture (beyond the upper limit of combustibility) to the combustion chamber of internal combustion engines: piston, turbine, jet engines as well as engines using detonation combustion. Said injector allows for the production of a homogeneous, over-enriched combustible mixture, in which fuel is completely evaporated, and for delivering it into the combustion chamber of an internal combustion engine.

Currently, internal combustion engines use a combustible mixture that is produced directly in the combustion chamber. The combustion chamber is mainly injected with fuel in its liquid form. The objective is for the fuel to be delivered (injected) to the combustion chamber in the form of atomised drops. The greater the degree of atomisation (finer droplets), the shorter the process of evaporation of drops and the more homogeneous the resulting combustible mixture.

There are a lot of systems for making a combustible mixture in internal combustion engines, such as the use of carburetors in piston engines, injection into the intake duct, direct injection into the combustion chamber, sequential (gradual) injection into the chamber or injection into the duct including evaporation of fuel etc. The systems for supplying fuel to the combustion chamber of the internal combustion engine are designed to properly prepare the combustible mixture, so that the combustion process in the engine was optimal (maximum performance of the engine, minimization of emission of noxious components of flue gas, stable engine operation etc.).

Proper preparation of the combustible mixture is essential for engines in which the process of preparation of the combustible mixture should last very short. This requires a very good atomisation of fuel. The smaller the diameter of the drops, the faster they evaporate. This is particularly important for high-speed piston engines, air turbine or jet engines, and in particular in engines using the detonation combustion process, such as pulsed detonation engines (PDEs) or in engines using the so-called rotating detonation, i.e. rotating detonation engines (RDEs).

Currently, the solutions of systems for making the combustible mixture in internal combustion engines, use carburetors (in piston engines), injection of fuel into the intake duct, direct injection into the combustion chamber (turbine engines and piston engines) etc.

The drawback of these systems lies in the need to ensure proper space and time for evaporation of liquid fuel and mixing thereof with an oxidant (e.g. air). Failure to ensure proper conditions yields a mixture with heterogeneous composition, giving rise in incomplete combustion, uneven temperature distribution in the engine chamber, local overheating of the combustion chamber elements, deposition of fuel on the walls, formation of slag and soot, increased emission of noxious combustion products.

In prior art, patent publication WO2013173162 (A2) discloses a solution relating to a chamber for premixing fuel and air. This chamber contains several separated zones, which are delimited by properly shaped partitions. This allows for mixing the sprayed fuel with air that is so dynamic that the drops of fuel are increasingly finer comminuted, while the elevated temperature of the chamber facilitates preliminary evaporation of the fuel. The solution also suggests controlling the proportions of the fuel and air mixture inside the chamber so as to prevent self-ignition. Such a solution, however, is unnecessarily complicated: it is expensive to produce a divided chamber with precision-formed compartments, while the complexity of the flow system of the air and fuel mixture induces increased flow losses. Moreover, a complicated flow system, whose walls may heat up to high temperatures, may contribute to the formation of carbon deposits on the walls of the chamber, which makes it impossible to use a chamber of this type for some fuels and imposes restrictions associated with fuel injection, especially in relation to the spraying angle. In addition, the document does not specify what should be the exact proportions of the fuel and air mixture in the chamber.

The object of the present invention is to obtain an injector with a pre-mixing and fuel evaporation chamber, wherein said injector is designed to accelerate the formation of a homogeneous gaseous combustible mixture in the combustion chamber of the engine, which significantly facilitates ignition and accelerates the combustion process, while ensuring the highest combustion efficiency and decreasing emission levels of noxious components of flue gas (hydrocarbons, carbon monoxide). The mixture contains fuel, air and, alternatively, flue gas, with its composition exceeding the upper limit of combustibility.

According to the present invention a fuel injector for injecting an over-enriched fuel and air mixture to the combustion chamber of an internal combustion engine, is characterised in that it comprises:
a hydrocarbon liquid fuel spray nozzle, at least one supply of a gaseous carrier, a fuel mixing and evaporation chamber and an injector nozzle to the engine combustion chamber (C.C.), configured such that, during operation,
liquid fuel is supplied and heated and compressed gaseous carrier are supplied to the fuel mixing and evaporation chamber of this injector through the spray nozzle, where they are mixed and evaporated as a result of elevated temperature, and the mixture of evaporated fuel with a hot gaseous carrier with low oxygen content thus formed reaches the combustion chamber (C.C.), through the outlet, wherein
the gaseous carrier is air or, alternatively, flue gas, at elevated pressure and temperature and having a composition that prevents the initiation of flame combustion, and
the gaseous carrier has oxygen content low enough to prevent the initiation of combustion, even under conditions of elevated pressure and temperature.

Preferably a gaseous carrier comprising air/oxidant, flue gas, air and flue gas, vapour, an addition thereof or a combination of all the components, is mixed in the injector chamber with heated fuel.

Preferably the injection of fuel into the mixing chamber is arranged coaxially relative to the symmetry axis of the mixing chamber, while the intake of the gaseous carrier is arranged axially, tangentially or radially relative to the lateral surface of the mixing chamber.

Preferably when the intake duct of the gaseous carrier to the mixing chamber is coaxial relative to said mixing chamber, the fuel supply duct is radially introduced to the gaseous carrier supply duct and the fuel is injected coaxially relative to the air flow axis.

Preferably the injector is located before the combustion chamber in an internal combustion engine, so that the process of evaporation of liquid fuel is transferred to the injector, from where a rich gaseous mixture is pressed into the combustion chamber.

Preferably the injector chamber is large enough to allow complete evaporation of the fuel and to allow preliminary fuel decomposition reactions to take place, in particular with the oxygen or water vapour contained in the carrier.

Preferably the oxygen concentration in the gaseous carrier is low enough to prevent the initiation of combustion.

Preferably the composition of the mixture in the injector is therefore outside the combustibility range, which prevents flame from being initiated in the injector system, but gives rise to the initiation of preliminary reactions of fuel decomposition.

Preferably the amount of oxygen in the injector supplied to the chamber is low enough to prevent the initiation of the combustion process, but high enough to promote the decomposition process of the evaporated fuel to the extent preventing the formation of carbon deposits.

Preferably the fuel supplied to the injector is pre-heated.

Preferably pressure in the supply system is high enough to ensure appropriate injection of the evaporated and partly decomposed fuel to the engine combustion chamber.

Preferably the injector operation is continuous in nature, especially in turbine or jet engines or RDEs (Rotating Detonation Engines).

Preferably the injector is pulsed, especially in piston engines or for PDEs (Pulsed Detonation Engines).

Preferably the injector comprises 1 or multiple supply ducts of the gaseous carrier.

Preferably if at least two or more intake ducts of the gaseous carrier are implemented, then said ducts are selected from any ducts comprising axial, tangential or radial supply relative to the lateral surface of the mixing chamber.

The pre-mixing and fuel evaporation chamber of the invention presents a structure which, given the simple structure thereof, can be used with practically any type of fuel. The simpler flow system reduces flow losses and the risk of carbon deposits forming on the walls of the chamber, while reducing the limitations in terms of the parameters of fuel injection into the inside of the chamber.

The proposed solution is advantageous in that it transfers the process of evaporation of liquid fuel to the injector, from where a rich gaseous mixture is pressed into the combustion chamber.

The invention will now be presented in greater detail in a preferred embodiment in reference to the accompanying drawings, in which:

FIG. 1A-FIG. 1E are diagrams of an injector of an over-enriched continuous combustible mixture of the invention, wherein: FIG. 1A is a general diagram, FIG. 1B illustrates an exemplary method of supplying a gaseous carrier producing turbulence, FIG. 1C illustrates an exemplary method of concurrent supply of a gaseous carrier, FIG. 1D illustrates an exemplary method of perpendicular supply of a gaseous carrier, FIG. 1E illustrates an exemplary method of supplying a gaseous carrier through two channels, namely a concurrent and perpendicular channels.

FIG. 2A the flame generated when the fuel is combusted with the fuel injected directly into the space where the combustion takes place without prior evaporation and mixing; and FIG. 2B the flame generated when combusting an over-enriched fuel and air mixture supplied to the combustion chamber using the injector of the invention.

The letters on the above drawings denote the following:
1—injector of hydrocarbon liquid fuel;
2—gaseous carrier supply;
3—mixing chamber;
4—injector nozzle;
C. C. —combustion chamber, and the arrow indicates the direction.

PREFERRED EMBODIMENT OF THE INVENTION

The essence of the invention is explained in the example shown in FIG. 1, where liquid fuel 1 and the heated and compressed gaseous carrier, e.g. air or flue gas 2, are supplied to the mixing chamber 3, where they are mixed and fuel is evaporated. The gaseous carrier should have oxygen content low enough to prevent the initiation of combustion, even under conditions of elevated pressure and temperature. The mixture of evaporated fuel with a hot gaseous carrier with low oxygen content reaches, through the outlet 4, the combustion chamber C.C., where together with the air from the combustion chamber it forms a gas and steam combustible mixture.

FIG. 1A through FIG. 1E are schematic representation of two embodiments of an injector with a pre-mixing and evaporation chamber.

Figure 1A:
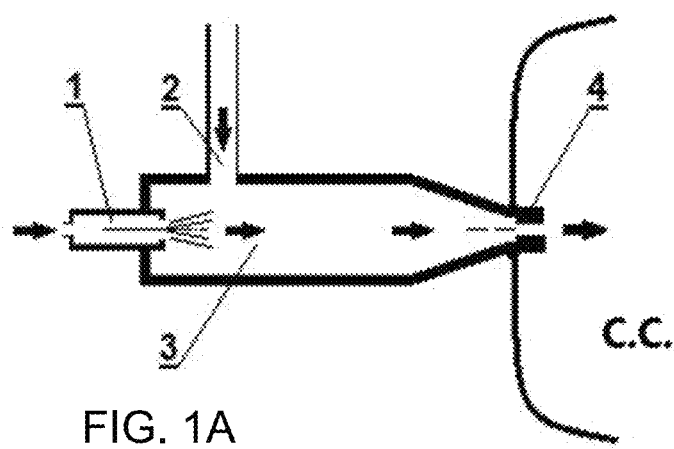
Figure 1B:
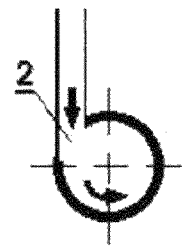
Figure 1C:
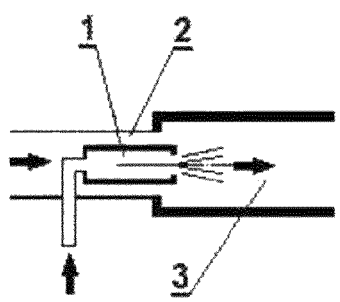
Figure 1D:
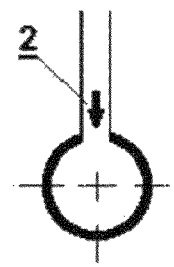
Figure 1E:
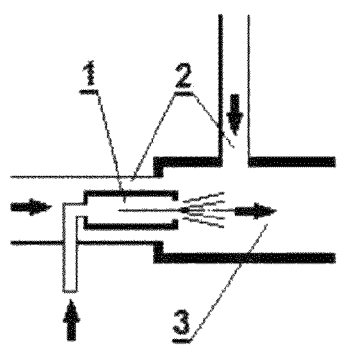

Layouts FIG. 1A, FIG. 1B and FIG. 1D relate to an injector with a pre-mixing chamber, wherein the shape of the mixing chamber is axisymmetric, e.g. cylindrical with a conically tapered end, through which products flow to the combustion chamber. In this embodiment, the injection of fuel into the mixing chamber is arranged coaxially relative to the symmetry axis of the mixing chamber, while the intake of the gaseous carrier, e.g. air, is arranged tangentially or radially relative to the lateral surface of the mixing chamber. Accordingly, the gaseous carrier flowing into the mixing chamber forms a turbulence which contributes to better mixing of the fuel and forms a boundary layer in the proximity of the inner side of the lateral walls of the mixing chamber, which prevents fuel particles from contacting the heated walls of the chamber and prevents the deposition of drops of fuel and e.g. formation of slag.

This simple construction also makes it easy to produce elements for the design of the injector of the invention, so that materials that are more difficult to process can be used to construct it while maintaining low production costs.

Layout FIG. 1C shows a different embodiment of the injector with the pre-mixing chamber of the invention, also axisymmetric in shape, different in that the intake duct of the gaseous carrier to the mixing chamber is coaxial relative to the mixing chamber. The fuel supply duct is radially introduced to the air supply duct, for example at a 90° angle, and the fuel is injected coaxially relative to the air flow axis. In this embodiment, there is a jet/at the cross-section of the mixing chamber inlet, in the middle of which there is fuel, which is ring-like surrounded by a gaseous carrier, e.g. air. As a result, the gaseous carrier separates the fuel particles from the walls of the mixing chamber. The further part of the mixing chamber can be made analogously to the example of layouts FIG. 1A and FIG. 1B, i.e. can be conically tapered.

In both embodiments, the gaseous carrier supplied to the mixing chamber is compressed and heated to promote mixing with fuel and evaporation of drops thereof. Carriers can include air, flue gas, water vapour and mixtures thereof, especially of air and flue gas.

In terms of the safe operation of the injector, the key issue is to ensure the right proportions of mixing the fuel with the gaseous carrier which contains an oxidant. In order to prevent ignition, the control system of the fuel and gaseous carrier supply maintains the fuel concentration in the mixture above the upper combustibility limit, so that the resulting mixture injected into the combustion chamber is over-enriched. This allows, provided there is an appropriate amount of the oxidant in the combustion chamber, for accelerating the combustion process and to control the shape and length of the flame with greater precision than before.

Figure 2A:
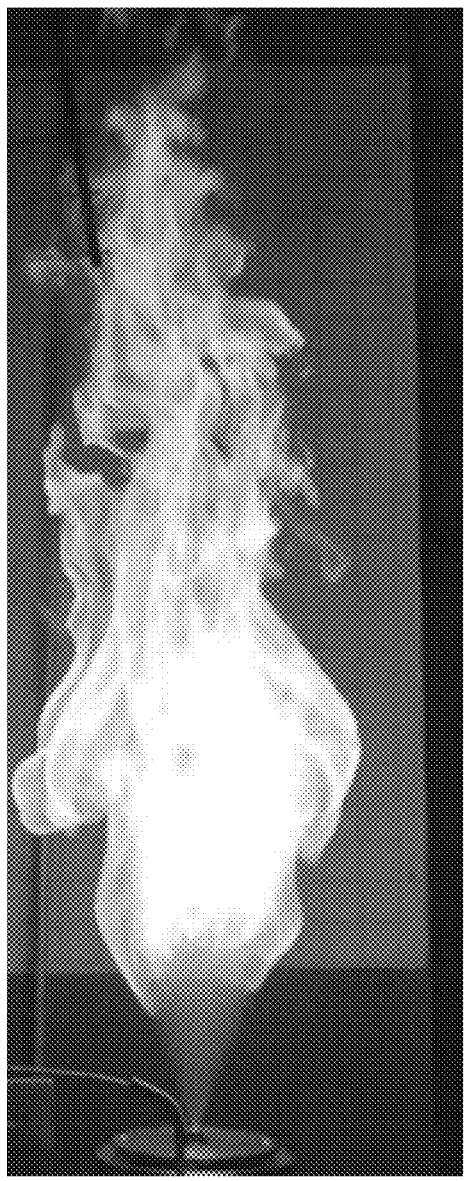
FIG. 2A and FIG. 2B are comparison of flames.

FIG. 2A is a photograph depicting an exemplary combustion process with liquid fuel being injected into the combustion chamber that has not been previously evaporated or mixed with a gaseous carrier that contains the oxidant. The flame starts only at some distance from the injector and it is of a considerable length. Its shape is rather chaotic; because of the turbulence of the flow in the combustion chamber single tongues of fire can move in different directions or even separate from the central flame. The combustion process of this type is very difficult to control and stimulates local overheating of flue gases, which promotes the formation of noxious substances, e.g. nitrogen oxides or soot.

Figure 2B:
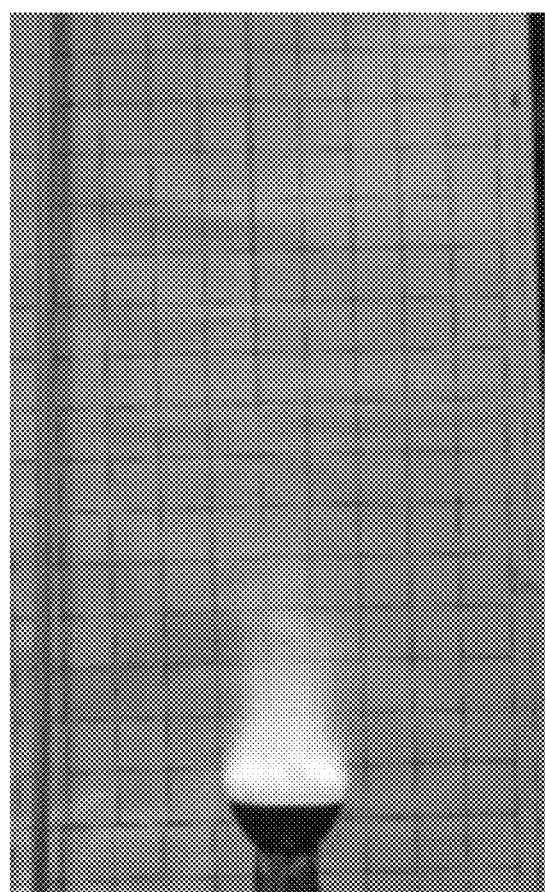
Figure 3A:
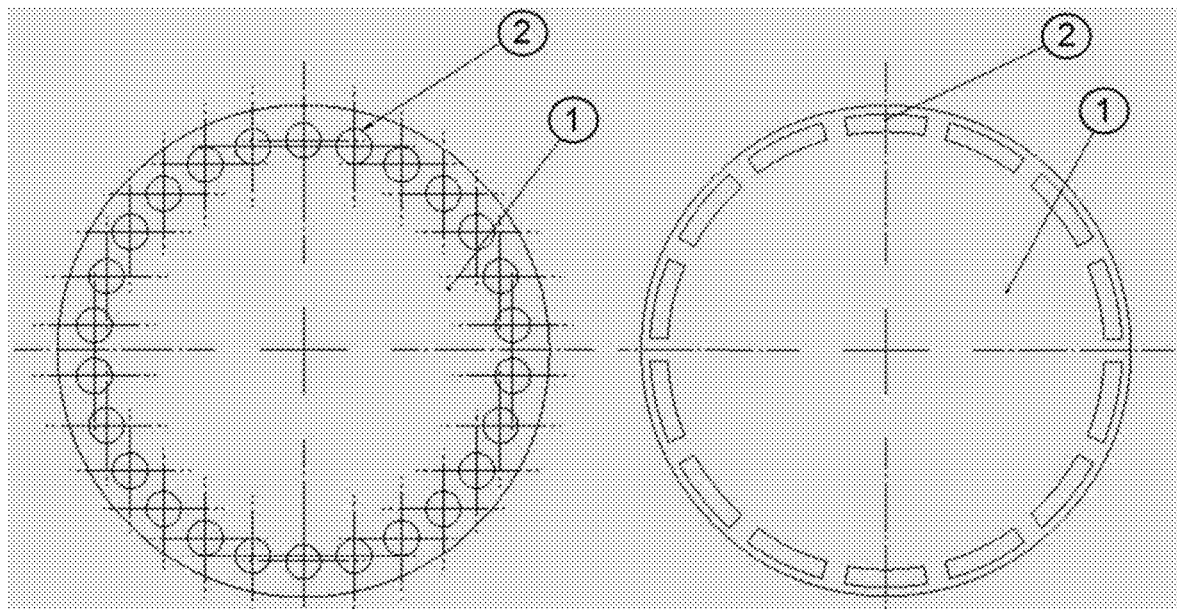
FIG. 3A and FIG. 3B illustrate an exemplary distribution of injector nozzles at the inlet of can (FIG. 3A) and ring (FIG. 3B) combustion chambers with continuous operation of turbine, jet or detonation engines (RDEs). On the left: cylindrical inlets of injectors, on the right, diaphragm injector inlets.
Figure 3B:
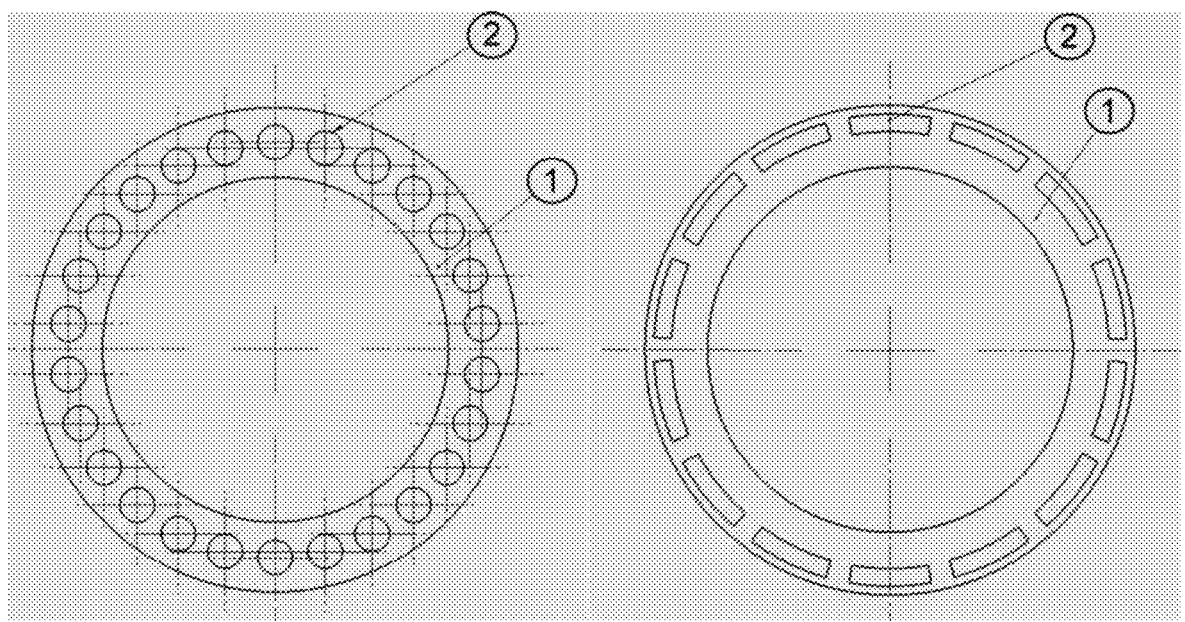

Now, FIG. 2B illustrates the combustion process when pre-mixed and evaporated fuel is supplied to the combustion chamber from the injector of the invention. The flame is clearly shorter than the one shown in FIG. 2A and it starts immediately at the injector outlet. The shape and dimensions of the flame can be virtually freely controlled by modifying the injection pressure, the amount of oxidant in the combustion chamber and the shape of the injection nozzle. Moreover, the flame has a homogeneous structure and is free of overheated zones, so that the temperature of the flame can be controlled in order to prevent the formation of noxious substances, e.g. soot or nitrogen oxides.

The composition of the mixture in the injection system should be within a concentration range to prevent the combustion process (above the upper combustibility limit), but promoting the preliminary decomposition of fuel components, which, following the injection into the combustion chamber, will allow for rapid formation of the combustible mixture and, as a result, rapid combustion. Preferably, the Air to Fuel ratio $\lambda$ ranges from 0.1 to approx. 0.4. In the instances shown in FIG. 2A and FIG. 2B, the composition of the mixture is the same: the air to fuel ratio is $\lambda=0.35$.

Rapid formation of the combustible mixture is of particularly importance when feeding detonation engines, in which case the time to form a combustible (detonating) mixture is very short. Injectors can be pulsed (e.g. in piston engines or for PDEs), or continuous (e.g. in turbine, jet or RDE engines).

The injectors can be single or multiple (e.g. distributed evenly at the perimeter of the engine chamber). The proposed injection system of evaporated fuel with a small amount of air or flue gas sensitizes the mixture being formed in the combustion chamber to the process of initiating and maintaining the combustion/detonation process.

The invention discloses an injection system of evaporated fuel and even of fuel that is partially decomposed in a gaseous carrier (by a small amount of air/oxidant, flue gas, air and flue gas, steam, an addition thereof or a combination of all the components) at elevated temperature and elevated pressure, having a composition that prevents the initiation of the combustion process in the injection system, but allowing for the process of evaporation and preliminary preparation/decomposition of the dose being injected to the combustion chamber/detonation chamber.

The amount of oxygen in the gaseous carrier supplied to the mixing chamber of the injector should be low enough to prevent the initiation of the combustion process, but high enough to promote the decomposition process of the evaporated fuel to the extent preventing the formation of carbon deposits.

The preliminary decomposition of fuel may also be promoted by fuel vapours reacting with hot water vapour (the reaction of carbohydrates with water vapour with mainly involve the formation of carbon oxide and dioxide, methane and hydrogen).

The invention claimed is:

1. A continuously rotating detonation engine comprising a fuel injector for injecting an over-enriched fuel and air mixture to a combustion chamber of the continuously rotating detonation engine, the combustion chamber having a lateral surface, comprising:
    a hydrocarbon liquid fuel spray nozzle (1), at least one supply of a heated gaseous carrier (2), a fuel mixing chamber (3) and an injector nozzle (4) to the combustion chamber, and configured such that, during operation,
    a liquid fuel is supplied to the mixing chamber (3) through the hydrocarbon liquid fuel spray nozzle (1),
    and a heated compressed gaseous carrier is supplied to the mixing chamber through the supply of the heated gaseous carrier (2),
    wherein in the mixing chamber (3) the liquid fuel and the heated gaseous carrier are mixed and fuel is evaporated as a result of an elevated temperature of the heated gaseous carrier forming a mixture of an evaporated fuel with the heated gaseous carrier that reaches the combustion chamber through the injector nozzle (4), wherein
    the heated gaseous carrier is air, a flue gas, a water vapor or mixtures thereof, and is at elevated pressure and temperature and having a composition that prevents the initiation of flame combustion, and
    the heated gaseous carrier has oxygen content low enough to prevent the initiation of combustion, even under conditions of elevated pressure and temperature of the heated gaseous carrier;
    with an air-to-fuel ratio $\lambda$ of the mixture in the fuel injector ranges from 0.1 to 0.4.

2. The continuously rotating detonation engine of claim 1, wherein a shape of the mixing chamber (3) is axisymmetric and the hydrocarbon liquid fuel spray nozzle (1) is arranged coaxially relative to a symmetry axis of the mixing chamber, while the supply of the heated gaseous carrier (2) is arranged axially, tangentially or radially relative to the lateral surface of the mixing chamber (3).

3. The continuously rotating detonation engine of claim 1, wherein
    a shape of the mixing chamber (3) is axisymmetric and an arrangement of the supply of heated gaseous carrier (2) is coaxial relative to the mixing chamber (3); and
    the hydrocarbon liquid fuel spray nozzle (1) is coaxially introduced to the supply of the heated gaseous carrier (2) such that the fuel is injected coaxially relative to a direction of heated gaseous carrier flow.

4. The continuously rotating detonation engine of claim 1, wherein the liquid fuel supplied to the fuel injector is pre-heated.

\* \* \* \* \*